INVENTOR
HUBERTUS PETRUS VAN SPIJK
JOHANNES MARTINUS VAN WEERT
BY Young + Thompson
ATTORNEYS Oct. 29, 1968   H. P. VAN SPIJK ET AL   3,408,085
DEVICE FOR SEALINGLY TRANSMITTING A LIQUID UNDER PRESSURE FROM
A STATIONARY STRUCTURAL PART INTO A ROTATING
SHAFT OR THE REVERSE
Filed March 14, 1966   2 Sheets-Sheet 2

INVENTORS
HUBERTUS PETRUS VAN SPIJK
JOHANNES MARTINUS VAN WEERT

BY Young & Thompson

ATTORNEYS

United States Patent Office 3,408,085
Patented Oct. 29, 1968

3,408,085
DEVICE FOR SEALINGLY TRANSMITTING A LIQUID UNDER PRESSURE FROM A STATIONARY STRUCTURAL PART INTO A ROTATING SHAFT OR THE REVERSE
Hubertus Petrus Van Spijk and Johannes Martinus Van Weert, Drunen, Netherlands, assignors to Lips N.V., Drunen, Netherlands, a corporation of Dutch law
Filed Mar. 14, 1966, Ser. No. 533,943
Claims priority, application Netherlands, Mar. 17, 1965, 6503395
1 Claim. (Cl. 277—72)

ABSTRACT OF THE DISCLOSURE

A seal for transmitting liquid between a stationary conduit and a conduit in a rotating shaft comprises a stationary ring encompassing the shaft and enclosed axially between two annular bodies rotatable with the shaft, with the conduit extending through the ring to an annular recess disposed between the ring and the shaft and that communicates with an axial conduit through the shaft. The ring and the two annular bodies have axial play relative to each other, and hydrodynamic seals are provided at the interfaces between the ring and the two annular bodies. The seal is surrounded by a casing that serves as a container for the transmitted liquid; and there is very low friction between the ring and the two annular bodies.

---

The invention relates to a device for sealingly transmitting a liquid under pressure from a stationary structural part into a rotating shaft or the reverse.

For several structures such as for the pitch varying mechanism of variable pitch ship's propellers the need is felt to supply oil under pressure to and to discharge it from the rotating shaft. Because it is desired to keep the mechanism in the shaft or in the propeller hub as small as possible it is particularly for large propellers preferable to maintain the oil pressure as high as possible.

This causes particular problems as to the feeding of the oil under pressure from the stationary structure into the rotating shaft. It has been tried to prevent the associated problems by having one or more pumps rotate with the shaft so that the oil transferred from the stationary structure into the shaft could have a low pressure, the pressure only being generated by the pumps in the rotating structure. This causes, however, particularly for shafts and propellers of large dimensions, particular structural problems and dangers.

The invention aims at providing a good solution for all such problems. To this end a device as indicated in the preamble is according to the invention characterized in that to one of the relatively rotating parts a ring is connected, having two end faces perpendicular to the shaft, said ring being enclosed between annular bodies connected to the other of the mutually rotating parts, which ring and annular bodies are allowed to have a slight relative axial movement, that the said ring is perforated for transferring the liquid under pressure, that the said end faces of the ring form a narrow slot with the adjacent surfaces of the annular bodies for sealing, and that means are provided for building up a liquid pressure hydrodynamically between said surfaces.

The seal is thereby allowed to adjust itself in order to obtain the correct narrow width of slot dependent upon oil pressure and viscosity, thermal expansion, rotating speed of the shaft, etc., between the ring and the annular bodies while preventing any mechanical contact. This is best achieved if according to the invention the said ring and the annular bodies are according to a preferred embodiment pushed together hydrostatically in that the pressure at the high pressure end of the said liquid seal operates on part of the back surface of at least one of the annular bodies.

It is known to have a hydraulic seal around a rotating shaft extending through the wall of a casing in which there is an oil pressure, which seal could operate hydrostatically or hydrodynamically. This is, e.g., known from the ASME publication 63–WA–91 of I. J. Billington: Characteristics of Hydrostatically-Actuated, Controlled-Leakage, Rotary-Shaft Seals Pressurized From An External Source.

The invention will now be explained in more detail with reference to the accompanying drawings, in which.

Figure 1:
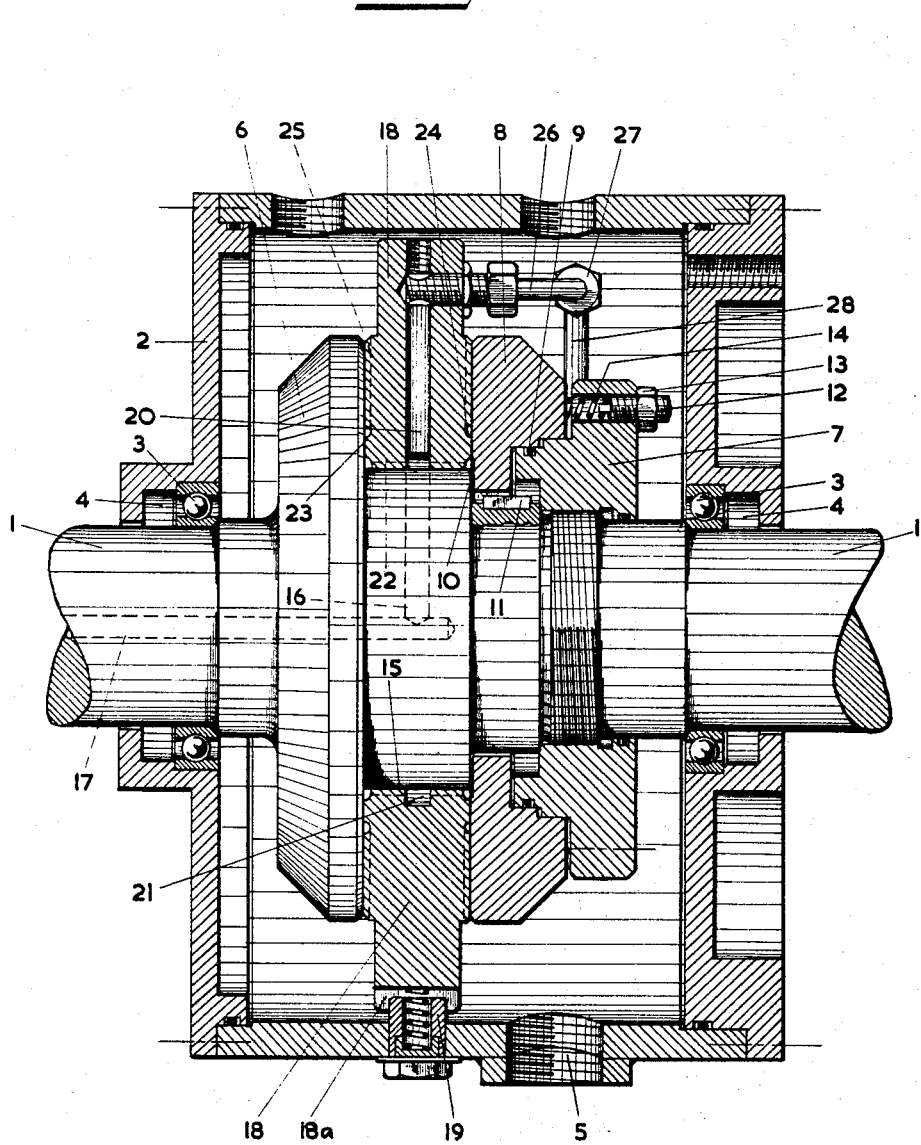
FIGURE 1 is an axial cross-section through part of a rotating ship's propeller shaft with a device according to the invention.

In FIGURE 1 the propeller shaft is indicated by 1. This is surrounded locally by a casing 2, which is supported by ball bearings 3 on the shaft and is moreover prevented from rotating with the shaft by means in the ship, which have not been shown in the drawing. Each ball bearing 3 borders an annular space 4 of rectangular cross-section, adapted to receive a usual packing seal, which need not satisfy high requirements because the oil in the casing 1 has only a very low pressure. At the lower part the casing is a discharge opening 5, from which leakage oil is allowed to flow to a sump or collecting tank. It is preferable to position this tank above the level of the casing 2, so that this casing is always kept full of oil under low pressure.

In the casing there is a flange or collar 6 rigid on the shaft 1 and at some distance thereform there is an annular body or ring 7 screwed onto the shaft. The ring 7 cooperates with a ring 8, which in the manner shown in the drawing partially engages around cylindrical parts of the ring 7 and is somewhat axially movable with respect to the ring 7, said rings 7 and 8 being mutually sealed on a cylindrical surface by an O-ring 9 of rubber.

The ring 8 has a shoulder 10 as a terminal abutment in the left hand direction as seen in the drawing. This shoulder forms a stepped part of the propeller shaft 1. By a key 11 allowing relative sliding movement in the axial direction the ring 8 is positively rotated by and with the propeller shaft. There are grooves along the part of the ring 8 cooperating with the shoulder 10, so that a minor quantity of oil is allowed to pass this shoulder 10 radially inwardly and to enter the space around the key 11 and thus to fill the space between the rings 7 and 8 up to the O-ring 9.

Several screwed studs 12, secured by nuts 13 in the ring 7, act upon springs 14 for slightly urging the ring 8 to the left.

Between the flange or collar 6 and the ring 8 the propeller shaft has a smooth cylindrical part 15, which is only perforated by a radial bore 16, opening into a central passage 17 in the centre of the shaft for feeding oil under pressure to an adjusting mechanism for the adjustment of the pitch of the blades of the propeller, e.g., to a piston in the propeller shaft, which by an adjusting rod is mechanically connected to the turnable propeller blades as is as such known in many embodiments.

Around the cylindrical surface 15 and between the collar 6 and the ring 8 a ring 18 is provided. By a bolt 19 screwed into and through the bottom of the casing 2 and engaging a notch 18a in the ring 18 this ring 18 is prevented from rotating with the propeller shaft 1 but is left free to make some axial movement with respect to casing 2. There is a radial bore 20 in this ring 18, opening at the inner surface of the ring into an annular oil groove 21. From this groove there are axially directed grooves 22 to both end faces of the ring 18. These end faces in the proximity of the radially inner part thereof have a flat annular part 23, around this part a groove 24 and around this groove a part 25 with a particular configuration which will be described in more detail below with reference to FIGURES 2 and 3.

An oil supply duct 26 is connected to the ring 18 and this duct at 27 has a connection with an oil supply duct 28, which connection 27 allows a slight pivoting movement of the ducts 26 and 28 with respect to one another. The duct 28 traverses the wall of the casing at a point not shown in the drawing, somewhere behind the ring 7 and the shaft 1 as seen in the drawing and where this duct traverses the casing it could have a connection allowing mutual pivotal movements of the stationary part outside the casing and the part within the casing, particularly part 28, in the same way as the pivoting connection 27. Thus it is possible for the ring 18 to adjust itself accurately on the propeller shaft 1, to follow vibrations of the shaft and to move somewhat axially therewith and also with respect to said shaft without rotating with it.

Instead of a rigid oil duct or a number of rigid oil ducts as shown with pivoting connections between the parts there could be a flexible high pressure hose.

Figure 2:
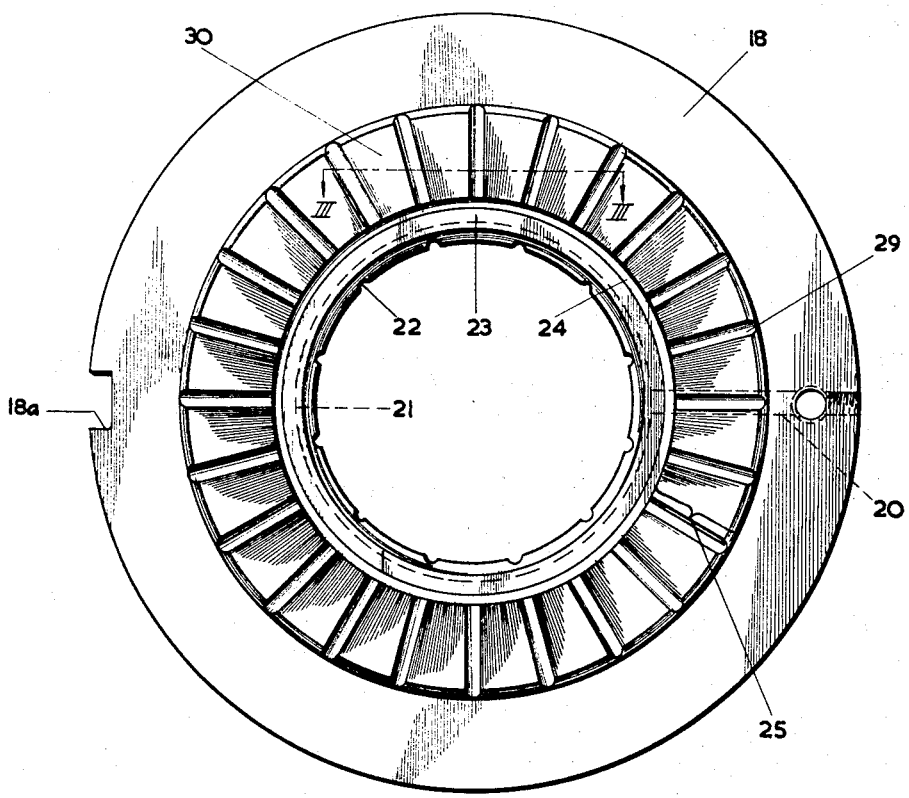
FIGURE 2 is a partial axial view of the ring used therein.
Figure 3:
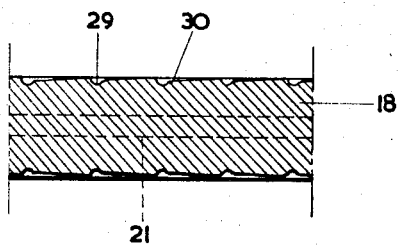
FIGURE 3 is a partial cross-section along the line III—III in FIGURE 2.

As appears from FIGURES 2 and 3 the surface 25 has grooves 29 and between the grooves somewhat inclined surfaces 30, inclined out of a plane perpendicular to the axis and in a circumferential direction.

If the ring 8 were to contact the shoulder 10 of the propeller shaft, the ring 18 would make a narrow fit between the collar 6 and the ring 8, leaving, however, a very slight clearance in the axial direction so that the ring 18 could remain stationary between the rotating collar 6 and the ring 8 with some small clearance so that there is neither mechanical contact nor much wear.

If with the propeller shaft rotating, oil under high pressure is fed to the adjusting mechanism this oil flows through the ducts 28 and 26 into the ring 18, flows through the radial bore 20 to the annular groove 21 and from there flows through the radial bore 16 in the propeller shaft to the passage 17 and through this passage to the adjusting mechanism for the propeller blades. Moreover this oil flows through the grooves 22 to the end faces of the ring 18. Thus this oil also flows through the grooves along the shoulder 10 to the key 11 and to the O-ring 9. The oil tends to leak to the annular surfaces 23 and from their to the groove 24 and from this groove radially outwardly along the surface 25 to free escape into the casing. The outer edges of the surfaces 30 are about in the same planes perpendicularly to the shaft as the continuous annular surfaces 23. The surfaces 30 give a hydrodynamic effect, which means that by the relative rotation of the shaft with respect to the ring 18 the oil is put under pressure such that this gives an axial force which keeps the ring 18 accurately between the collar 6 and the ring 8 without contacting either of these parts, so that the surfaces 23 are not in metallic contact with the parts opposite to them and rotating with the propeller shaft. Moreover this hydrodynamic pressure prevents undue leakage along the continuous annular surfaces 23. Preferably the annular surfaces 23 extend somewhat less than the highest parts of the surfaces 30 as seen in the axial direction. An equilibrium is obtained, in which a narrow slot between the ring 18, the collar 6 and the ring 8 remains on both sides of the ring 18 so that metallic contact between these surfaces is avoided and nevertheless the leakage of high pressure oil is as small as possible. For the equilibrium of the rings 8 and 18 not only the oil pressures in the end faces of the ring 18 are of importance, but also the oil pressure which exists in the oil filling the space of the key 11 and up to the O-ring 9. By this pressure the ring 8 is pushed towards the ring 18. Moreover there is the pressure of the springs 14. If there was no such force pushing the ring 8 towards the collar 6 the hydraulic pressure in the end faces of the ring 18 would push the ring 8 away until there would be very high leakage avoiding the building up of a high pressure of oil in the passage 17 and in the adjusting cylinder for the propeller blades.

It has appeared that with such a structure as described above very high oil pressures could be applied, e.g., of 250 atmospheres or higher, without unduly great leakage and without mechanical wear of the contacting surfaces. Such high oil pressures have the considerable advantage that the adjusting device can be designed with very small dimensions, also if high forces have to be exerted, e.g., for large variable pitch ship's propellers.

Of course an adjusting cylinder for adjusting the pitch of the propeller blades usually has two ducts, one supply duct and one discharge duct, or at least two ducts of which at one time when adjusting in one direction one is the supply duct for the oil and the other is the discharge duct in which no high pressure occurs, and when adjusting in the other direction the first named duct is now the discharge duct for oil of low pressure and the other duct is the supply duct for oil of high pressure. The discharge duct gives of course no particular problem as the oil therein is under low pressure. In such cases there could be two ducts 17 one to the side of the other or one concentrically within the other in the propeller shaft and the casing 2 could be much longer having two devices of the kind described one to the side of the other, one acting at a certain moment to supply oil under high pressure and the other to discharge oil under low pressure and at another time the first named annular structure acting to discharge oil under low pressure and the last named structure supplying oil under high pressure. It is, however, also possible to have an adjusting device for the propeller blades, known as such, in which the oil acts in one direction to adjust the propeller blades, there being a spring or other simple mechanical means to return the propeller blades or to adjust them in the other direction if the oil pressure permits. In that case only one duct 17 and only one device as shown are sufficient.

For large diameter propeller shafts the flange 6 and the rings 8 and 18 will have relatively smaller radial dimensions in relation to the diameter of the propeller shaft. Thus they will not extend so much outside the propeller shaft proportionally as in the structure shown in the drawing.

Although propeller shafts with propellers with adjustable blades usually rotate, only in one direction, the structure could also be applied to reversible shafts, in which case there could be two sets of surfaces 30, alternating in the circumferential direction, each one surface 30 of one set being inclined in one direction circumferentially and each one of the other set being inclined in the other direction circumferentially.

Particularly for large diameter propeller shafts the surface 15, the key 11 and the screwthread taking up the ring 7 need not be made in and from the shaft itself, but could be made in a separate sleeve shrunk onto the shaft or the like. The collar 6 could of course also be a separate part fixed by shrinking or by bolts or dowels to the propeller shaft. For facilitating assembly the several rings could be made of two semicircular parts united by bolts transversely to their separating plane as is known as such.

We claim:

1. A device for sealingly transmitting a liquid under pressure between a stationary structural part and a rotating shaft, comprising a ring encompassing the shaft and connected to one of said stationary part and rotating shaft and having two end faces perpendicular to the shaft, two annular bodies encompassing the shaft and connected to the other of said stationary part and rotating shaft, said ring being disposed between said two annular bodies so that said ring and two annular bodies have rotation relative to each other at their interfaces, said ring being perforated for the transfer of liquid therethrough under pressure, said ring and annular bodies having axial play relative to each other, means at said interfaces for building up liquid pressure hydrodynamically upon rotation of said ring and annular bodies relative to each other, said ring being connected to said stationary part, said annular bodies being connected to said rotating shaft with one of said annular bodies being rigidly connected to the shaft, said ring having a flexible liquid connection communicating with the perforation of said ring, and means for pushing the other said annular body toward the ring and toward the annular body which is rigidly secured to the shaft.

References Cited
UNITED STATES PATENTS

| | | | |
|---|---|---|---|
| 1,876,515 | 9/1932 | Emmet | 277—74 X |
| 2,230,881 | 2/1941 | Browne | 277—22 X |
| 2,265,953 | 9/1941 | Mortensen et al. | 277—74 |
| 3,033,579 | 5/1962 | Seaver | 277—91 |

SAMUEL ROTHBERG, *Primary Examiner.*